United States Patent [19]
Gritton

[11] Patent Number: 5,321,753
[45] Date of Patent: Jun. 14, 1994

[54] SECURE COMMUNICATION OF STATIC INFORMATION BY ELECTRONIC MEANS

[75] Inventor: Dale G. Gritton, Pleasanton, Calif.

[73] Assignee: The United States of America as represented by the United States Department of Energy, Washington, D.C.

[21] Appl. No.: 726,610

[22] Filed: Jul. 8, 1991

[51] Int. Cl.$^5$ .............................................. H04K 1/00
[52] U.S. Cl. ...................................... 380/42; 380/22; 380/23; 380/46; 340/572
[58] Field of Search .................. 380/2, 22, 23, 42, 46, 380/49, 52; 340/572

[56] References Cited

U.S. PATENT DOCUMENTS

| | | | |
|---|---|---|---|
| 4,087,626 | 5/1978 | Brader. | |
| 4,471,345 | 9/1984 | Barrett, Jr. | 340/572 |
| 4,656,463 | 4/1987 | Anders et al. | 340/572 |
| 4,807,284 | 2/1989 | Kleijne | 380/3 |
| 4,876,716 | 10/1989 | Okammoto | 380/21 |
| 4,885,778 | 12/1989 | Weiss | 380/48 |
| 4,932,057 | 6/1990 | Kolbert | 380/33 |
| 4,944,007 | 7/1990 | Austin | 380/21 |
| 5,075,670 | 2/1991 | Bower et al. | 340/572 X |
| 5,097,505 | 3/1992 | Weiss | 380/23 |

*Primary Examiner*—Tod R. Swann
*Attorney, Agent, or Firm*—Isabelle R. McAndrews; Roger S. Gaither; William R. Moser

[57] ABSTRACT

A method and apparatus (10) for the secure transmission of static data (16) from a tag (11) to a remote reader (12). Each time the static data (16) is to be transmitted to the reader (12), the 10 bits of static data (16) are combined with 54 bits of binary data (21), which constantly change from one transmission to the next, into a 64-bit number (22). This number is then encrypted and transmitted to the remote reader (12) where it is decrypted (26) to produce the same 64 bit number that was encrypted in the tag (11). With a continual change in the value of the 64 bit number (22) in the tag, the encrypted numbers transmitted to the reader (12) will appear to be dynamic in character rather than being static.

6 Claims, 2 Drawing Sheets

SECURE COMMUNICATION OF STATIC INFORMATION BY ELECTRONIC MEANS

The Government has rights in this invention pursuant to Contract No. W-7405-ENG-48 awarded by the United States Department of Energy.

The invention relates to the secure transmission of static information. The term "secure" implies that an adversary has access to the communication channels and a functional knowledge of the system but cannot extract desired information.

Numerous secure communication systems exist that employ some form of encryption of the data before it is transmitted to a remote receiving station. However, if the data to be transmitted is static, i.e. of constant value, then the encrypter will produce a common output for each transmission of the data. Although an adversary without knowledge of the encryption keys could not decode the information he would be able to tell whether the information was static or dynamic. This knowledge could aid the adversary, as in the following situation.

Electronic tagging devices are in common usage for inventory control in both commercial and governmental applications. In some instances, a donor may put a device in the custody of an adversary to be kept at a given location from which the donor is excluded. In such a case, an electronic tag will be affixed to the device, the tag having a tamper detector, often referred to as a seal, which is integrated with a device to ensure that the tag has not been removed from the device and transferred to a surrogate. When such a tag is interrogated from a remote location, it will uniquely identify itself and provide tamper sensor status. This information is encrypted and can only be decrypted by a interrogator that has knowledge of the particular encryption keys.

However, if the tamper sensor's status response is static, the encrypted data will likewise be static. With the tagged device in the custody of the adversary, the communication channels would be available to the adversary and the encrypted response would be known to the adversary. The adversary could transfer the tag to a surrogate device and make adjustments until the tamper sensor returns to its pre-transfer encrypted readings. This is possible even though the adversary has no knowledge of what the encrypted tamper sensor data actually represents. For many applications where security is of paramount importance, this inherent problem presents unacceptable risks. This problem also exists if the tamper sensor produces quasi-dynamic readings of limited range.

SUMMARY OF THE INVENTION

It is the primary object of the present invention to provide a system which will preclude even a very sophisticated adversary from extracting static or quasi-dynamic tamper sensor date from an encrypted wavetrain.

Additional objects, advantages and novel features will be set forth in the description which follows, and in part will become apparent to those skilled in the art upon examination of the following, or may be learned by practice of the invention. The objects and advantages of the invention may be realized and attained by means of the instrumentalities and combinations pointed out in the appended claims.

To achieve the foregoing and other objects, and in accordance with the present invention as described and broadly claimed herein, a tag is provided which will combine dynamic information with the static tamper sensor status information from the seal prior to encryption and transmission, so that all transmissions appear to be fully dynamic and only by decrypting the transmitted message can the static information be separated from the masking effect of the appended dynamic information.

In one aspect of the invention a continually changing cycle counter in the tag is used to provide the dynamic information to be combined with the static information from the seal.

In another aspect of the invention, a random number generator in the tag is used to provide the dynamic data.

BRIEF DESCRIPTION OF THE DRAWINGS

The accompanying drawings, which are incorporated and form part of the application, together with the description serve to explain the principles of the invention.

DESCRIPTION OF THE PREFERRED EMBODIMENTS

Figure 1:
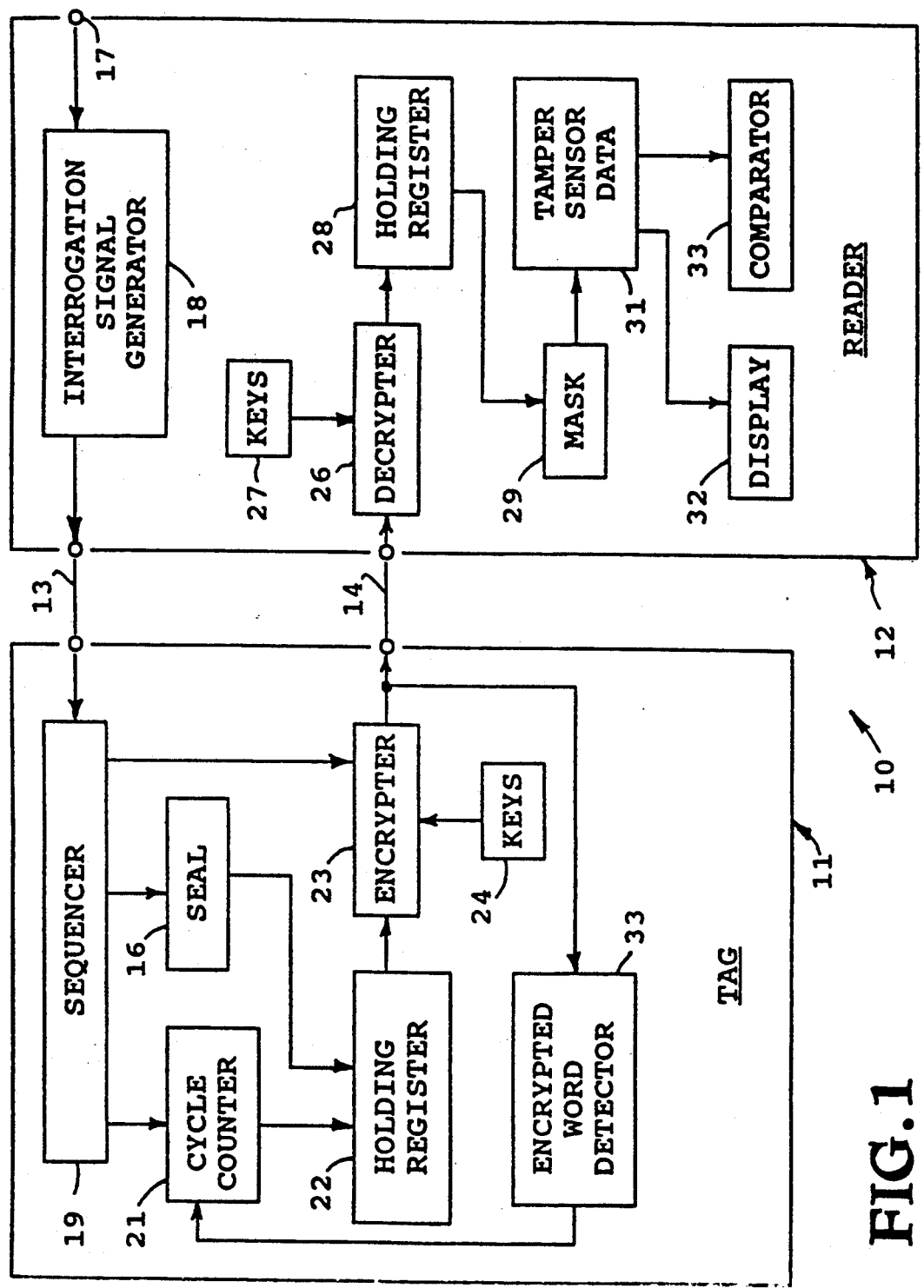
FIG. 1 is a block diagram of the components of a tag and a reader in accordance with the present invention.

Referring now to FIG. 1 of the drawings, the communication system 10 comprises a tag 11 adapted to be affixed to a particular device (not shown) and a reader 12 remotely located from the tag and in communication with the tag by channels 13 and 14. The tag 11 includes a seal 16 which is uniquely related to the device to which the tag is affixed and which will provide a unique multi-bit tamper sensor data signal identifying the device. For purposes of description the tamper sensor data signal is assumed to be a unique binary number of 10 bits in length. The sequence of the 10 bits will be the same every time that the tag 11 is interrogated, as long as the tag remains affixed to the particular device that is being monitored.

In operation of the system, an external "Execute" signal is applied to terminal 17 of the reader 12 which causes the interrogation signal generator 18 to send a signal over communication channel 13 to sequencer 19 of tag 11. The sequencer 19 causes the cycle counter 21 to send 54 bits of data, and the seal 16 to send its 10 bits of data to holding register 22 to form a 64-bit number therein. The location of the 10 bits of tamper sensor data in register 22 is a matter of choice. For example, the first 54 bits of the number in register 22 may come from the cycle counter 22, with the tamper sensor data being the last 10 bits of the 64 bit number.

The 64-bit number is then sent to the encrypter 23 which will encrypt the number in accordance with the encryption keys 24, to produce a 64-bit encrypted number. In accordance with present encryption technology, a change in only one of the bits of the 64-bit number in register 22 will produce a substantially changed encrypted number, with the change in the encrypted number being unpredictable. The degree of change and of the unpredictability will, of course, depend upon the quality of the encryption keys 24.

The encrypted number then passes by way of communication channel 14 to the decrypter 26 of the interrogator 12, and the number is decrypted in known manner in accordance with the decryption keys 27. The keys 27 are, of course, the same as keys 24. The decrypted number is now sent to holding register 28, and the 64 bits in register 28 will be the same as was in tag register 22 prior to encryption. The contents of register 28 will now be sent through mask 29 to the tamper sensor data register 31. The mask 29 will remove the data bits from the cycle counter in tag 11. For example, the mask 29 may function to multiply the first 54 bits in register 29 by "0" and the last 10 bits by "1". By so doing, all of the first 54 bits from register 29 will become "0" while the data in the last 10 bits will be unchanged. Thus, the data passing through mask 29 to register 31 will be identical to the data in the tag seal 16.

The data in register 31 may be sent to a data display device 32 or to a comparator 33 for comparison with the known value of the data that the tag seal 16 should produce.

In tag 11, the encrypted word detector 34 will sense the completion of the transmission of the encrypted number to the decrypter 26 and will send a signal to the cycle counter 21 causing it to advance one count for the next interrogation. With 54 bits of data going from the cycle counter 21 to the register 22, and with the count being increased by "1" on each successive cycle of operation, $2^{54}$ interrogations must occur before any repetition of data from the cycle counter can occur. If interrogations are made at one second intervals, only about $2^{25}$ interrogation cycles would occur in a year's time. Accordingly, for all practical purposes, the output of the cycle counter 21 will not repeat.

Tags 10 generally do not have any internal power sources and are powered only from the reader 12 during interrogation. As a consequence, the cycle counter 21 of FIG. 1 must have a nonvolatile memory to prevent the counter from being reset between interrogations.

Figure 2:
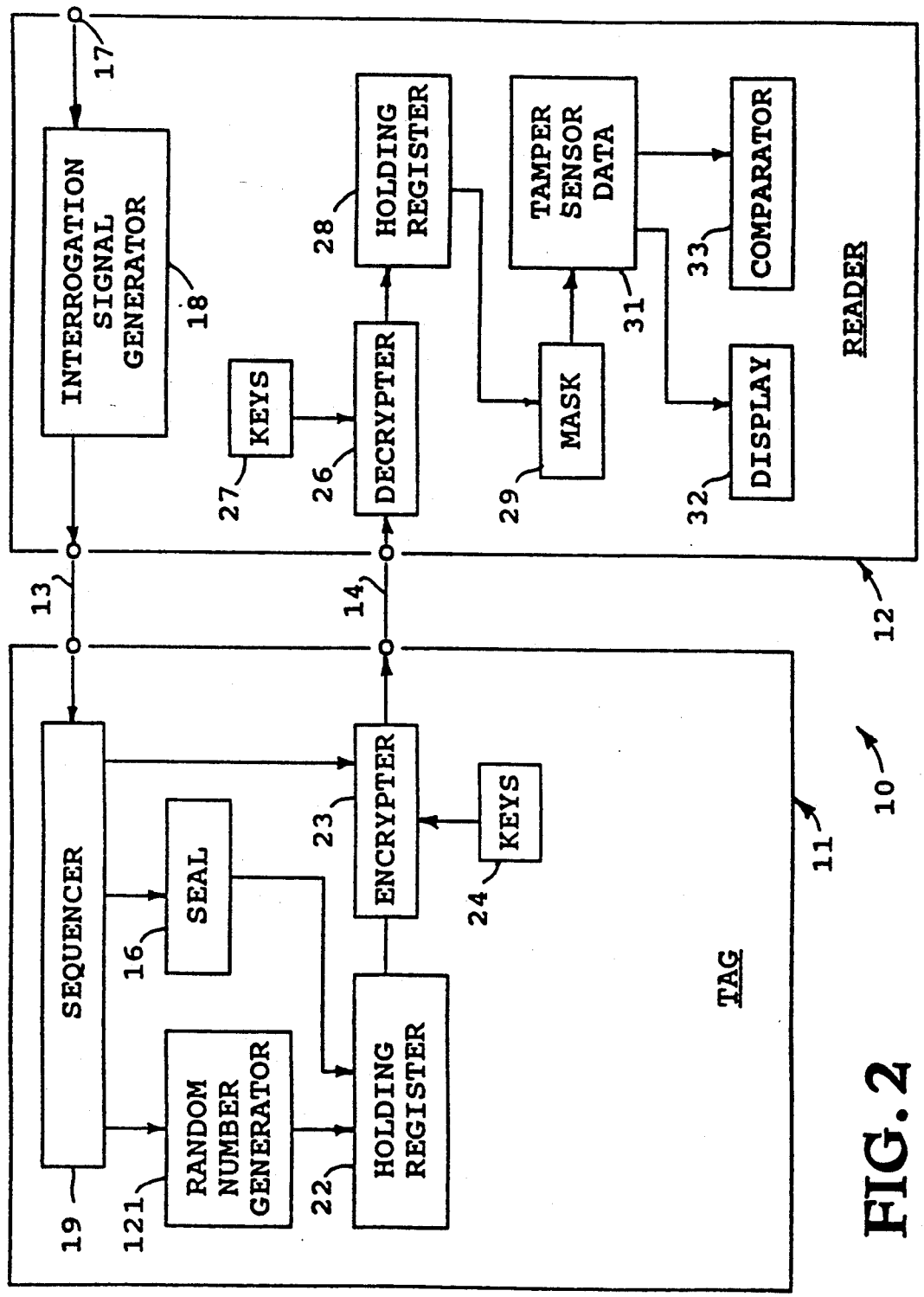
FIG. 2 is similar to FIG. 1, but illustrates the components of an alternate form of tag 11.

FIG. 2 discloses a secure communication system 100 wherein the reader 12 is as described above but the tag 110 uses a random number generator 121 in place of the cycle counter 21 of FIG. 1 to provide the first 54 bits of data to the holding register. The operation of the system of FIG. 2 is as described above, with a different arrangement of bits being fed from the random number generator 121 (and the same arrangement of 10 bits from seal 16) to register 22 on each interrogation of the tag.

The system of FIG. 2 does not require a non-volatile memory since the random number generator does not reset. However, the security of this system is limited by the quality of the random numbers.

The foregoing description of the preferred embodiments has been presented for purposes of illustration and description. It is not intended to be exhaustive or to limit the invention to the precise forms described, and obviously many other modifications are possible in light of the above teaching. The embodiments were chosen in order to explain most clearly the principles of the invention and its practical applications thereby to enable others in the art to utilize most effectively the invention in various other embodiments and with various other modifications as may be suited to the particular use contemplated. It is intended that the scope of the invention be defined by the claims appended hereto.

I claim:

1. A tag adapted to be affixed to a device and adapted to be interrogated from a remote location, said tag comprising:
    means for generating m number of binary bits having a static value unique to the device to which the tag is affixed,
    means for generating n number of binary bits of binary data, with the value of the n number of binary bits being different on each interrogation of said tag,
    means responsive to an interrogation of said tag for combining said m number of bits and said n number of bits into a combined number having m+n number of bits and with said n number of bits being at a predetermined location in said number,
    encryption keys in said tag,
    means for encrypting said combined number in accordance with said encryption keys for transmission to said remote location.

2. A tag as set forth in claim 1, wherein said means for generating n number of binary bits comprises a cycle counter, and wherein said tag further includes means for changing the count in said cycle counter on each interrogation of said tag.

3. A tag as set forth in claim 1, wherein said means for generating m number of binary bits comprises a random number generator.

4. A system for secure communication of static information comprising:
    a tag adapted to be affixed to a device and adapted to be interrogated from a remote location,
    means in said tag for generating m number of binary bits having a static value unique to the device to which the tag is affixed,
    means in said tag for generating n number of binary bits of binary data, with the value of the m number of binary bits being different on each interrogation of said tag,
    means in said tag responsive to an interrogation of said tag for combining said m number of bits and said n number of bits into a combined number having m+n number of bits and with said n number of bits being at a predetermined location in said number,
    encryption keys in said tag,
    means in said tag for encrypting said combined number in accordance with said encryption keys for transmission to said remote location,
    a reader adapted to be at said remote location,
    means in said reader for interrogating said tag,
    decryption keys in said reader, said decryption keys being the same as said encryption keys in said tag,
    means in said tag for receiving said encrypted number from said tag and for decrypting said encrypted number in accordance with said decryption keys to produce a decrypted number of n+m binary bits with said n number of bits being in the same location in said decrypted number as they were in the number in said tag prior to encryption.

5. A system as set forth in claim 4 wherein said means in said tag for generating n number of binary bits comprises a cycle counter, and wherein said tag further includes means for changing the count in said cycle counter in each interrogation of said tag.

6. A system as set forth in claim 4 wherein said means in said tag for generating m number of binary bits comprises a random number generator.

* * * * *